June 22, 1926.                                                          1,590,171
                        C. E. SPINNLER
                COMBINED TRIP AND THROTTLE VALVE
                    Filed Feb. 14, 1923          2 Sheets-Sheet 2

Inventor:
Charles E. Spinnler,
by [signature]
    His Attorney.

Patented June 22, 1926.

1,590,171

UNITED STATES PATENT OFFICE.

CHARLES E. SPINNLER, OF SCHENECTADY, NEW YORK, ASSIGNOR TO GENERAL ELECTRIC COMPANY, A CORPORATION OF NEW YORK.

COMBINED TRIP AND THROTTLE VALVE.

Application filed February 14, 1923. Serial No. 619,040.

The present invention relates to valves which have the combined function of throttle and emergency valve and which are primarily adapted to control the admission of steam or other operating fluid to prime movers.

More specifically this invention relates to an improved mechanism which may be applied to and connected with a valve of the throttle type whereby it may have the combined function stated above.

This improved mechanism provides means whereby the valve, to which it may be connected, may be opened and closed under ordinary conditions in the usual manner to regulate and control the fluid flow or may be closed suddenly from any open position under emergency conditions or whenever desirable or necessary by tripping the mechanism either manually or by any other desirable means to cut off the fluid flow.

The object of the invention is to provide in conjunction with a throttle valve an improved mechanism of the type and for the purpose described which is simple, compact and rugged in structure and positive in action under all conditions.

In the accompanying drawings.

Figures 1, 2:
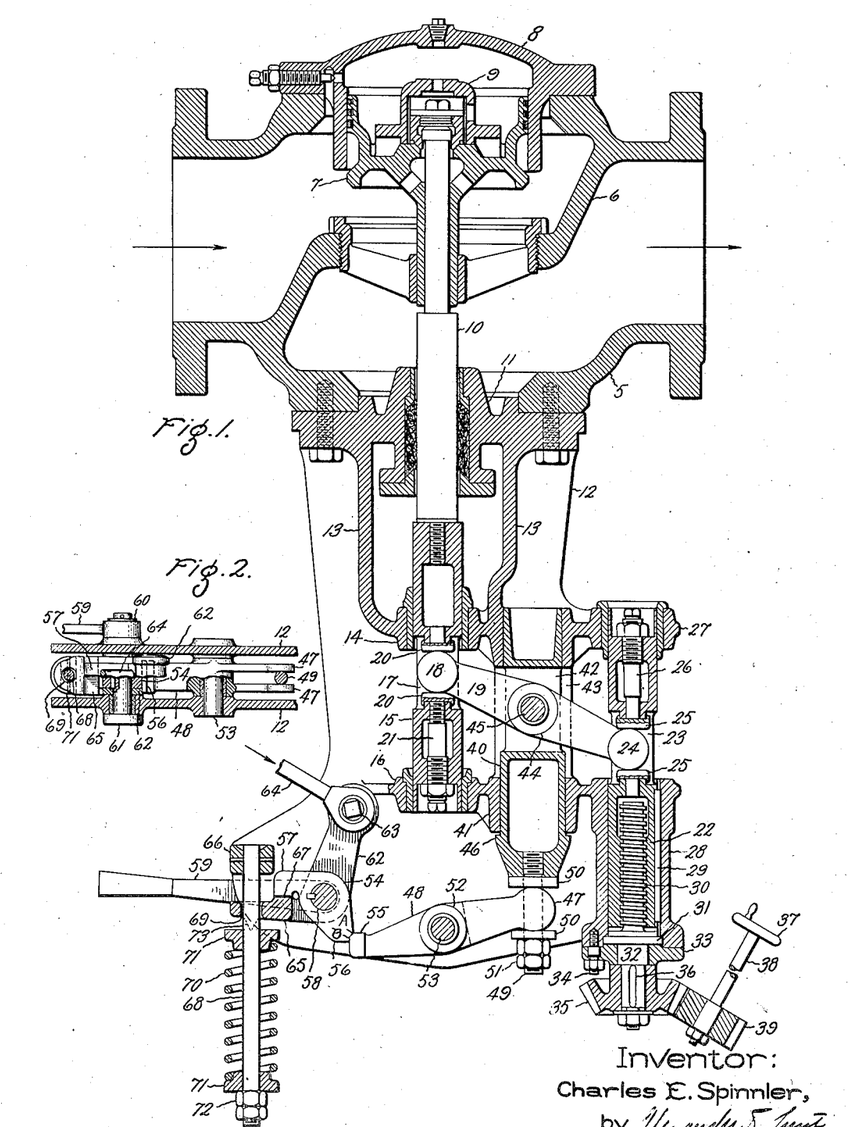
Fig. 1 illustrates in section one embodiment of my invention with the valve mechanism set in the full open position.
Fig. 2 is a detail showing a reduced size top view of the tripping mechanism of Fig. 1.

Referring now particularly to Fig. 1, 5 is an ordinary flanged valve casing, the interior of which is divided by a diaphragm 6 into high and low pressure chambers according to the usual practice with a main valve 7 controlling the opening between them. This valve is provided with a dash pot 8 to cushion the closing action and a by pass valve 9 to make for easy opening of the main valve. Both the main valve 7 and the by-pass valve 9 are operated by a valve rod 10 which passes through a stuffing box 11 downwardly to the valve mechanism below. The arrows indicate the direction of fluid flow through the valve. This is a usual type of valve employed in conjunction with elastic fluid prime movers and is here used only for purposes of illustration as being typical of a valve to which my invention is particularly directed.

Such a valve is characterized by a reciprocating valve operating rod as distinguished from one operated directly by the usual screw threaded rod and is further characterized by the fact that it is continually urged toward the closed position by a force sufficient to close it when released by the mechanism holding it open. In the valve here shown this closing force is supplied by the fluid pressure acting on the valve itself, the high pressure side of which is of larger area than the low pressure side, and when the valve is mounted as shown with the valve operating rod extending downwardly, the weight of the parts supplements this force.

It is not necessary that the valve, with which my invention may be used, have a by-pass valve as part of the main valve as shown, although this is a desirable feature, nor is it necessary that the valve be of such structure that the weight of its parts or the fluid pressure provide the constantly acting force which tends to close it, as this force may be supplied by other means, as, for example, by a spring incorporated in the valve structure or embodied in the valve mechanism itself.

In view of the fact that the specific structure of the valve is not part of the invention and its construction and operation is known and well understood, further description is believed to be unnecessary.

Integral with and joined and spaced by the flanged stuffing box 11, which is rigidly bolted to the valve casing are two flat frame plates 12, one of which appears in this sectional figure while both are shown in Fig. 2. These frame plates extend downwardly parallel to each other and carry the valve operating mechanism between them. They are integral with and further joined and spaced by webs 13—13 which terminate at their lower ends into a bearing bracket 14. This bracket is bushed to form a guide bearing for an axial extension 15 of the valve operating rod 10. A second and lower bearing bracket 16 cast integral with the frame plates serves to join and space the frame plates and to provide a guide bearing for the lower end of the valve rod extension 15.

This bearing bracket is bushed like bracket 14 and is spaced therefrom a distance along the valve rod extension substantially greater than the distance of the valve travel.

The valve rod extension 15 is diametrically slotted at 17 to receive a short cylindrical head 18 on one end of a lever 19 thus providing a sliding pivotal connection between said lever and the valve rod extension 15. This connection is maintained between the periphery of the cylindrical head and the ends of the slot 17 without binding and without back lash by abutments 20—20 calipered by an adjustment screw 21 into proper driving connection with said cylindrical head 18.

The connection between the lever 19 and the valve rod extension 15 is duplicated at the opposite end of said lever in the pivotal sliding connection there provided between it and a sliding sleeve 22, the latter being slotted as shown at 23 to receive a short cylindrical head 24 which is a duplicate of cylindrical head 18. The slot is provided with abutments 25—25 which are adjustably calipered by a screw 26 into proper driving connection with the cylindrical head 24.

Sliding sleeve 22 is guided and supported in two bearings brackets 27 and 28 which are cast integral with the frame plates 12—12. The upper or guide bearing bracket 27 carries the upper end of said sliding sleeve and is bushed similar to bearing bracket 14. The lower bearing bracket 28 serves to guide and support the sliding sleeve 22 and a spline and spline way 29 located therein serves to confine said sliding sleeve to sliding movement only. These bearings maintain the sliding sleeve parallel to and axially in the same plane with the valve rod extension 15.

The sliding sleeve is axially threaded at its lower end to receive a square-threaded operating spindle 30, and is here shown in its lower most position with said spindle fully threaded into it. This spindle is enlarged at a point in its length to seat in a counterbore at the lower end of the bearing bracket 28 forming a thrust bearing 31 therewith. This bearing is backed-up and a bearing formed for a necked portion 32 of the spindle 30 by a cover plate 33 which fits over the lower faced end of the bracket 28. This cover plate is secured thereto by a series of dowel bolts 34 located about the counterbore opening.

One of these dowel bolts appears in the section.

The operating spindle 30 extends beyond the cover plate 33 to receive a beveled operating pinion 35 to which it is keyed as shown at 36. This pinion may be replaced by an operating handwheel for direct manual operation of the valve, as in the case where the valve is so located that the handwheel would come into correct position for efficient manipulation. However when the valve is located in a low position the pinion is used, as shown, with a handwheel 37 located at any convenient position above, and connected with the pinion 35 by a shaft 38 and a gear 39.

Substantially midway between the sliding sleeve 22 and the valve rod extension 15 and axially parallel and co-planar with them is a cylindrical carrier 40 for the lever 19. This is freely slidable in a long bearing 41 which is integral with the frame plates 12—12 and securely webbed near its upper end between bearing brackets 14 and 27 and near its lower end between bearing brackets 16 and 28.

The lever carrier 40 and the bearing 41 are both diametrically slotted as shown at 42 and 43 respectively for a length sufficient to allow the lever 19 to pivot at a point between its ends on a bushed hub 44 about a short horizontal shaft 45. This shaft is secured at its ends in the walls of the slot 42 in said lever carrier. The slot 43 in the bearing 41 is substantially wider than slot 42 and its length is such that at no time in the operation of the valve will the lever strike its ends.

The lever carrier 40 is shown in its normal or raised position. Any tendency to move upward from this position is prevented by shoulder 46 which is presented for engagement with the lower faced end of bearing 41. The lever carrier is at the same time prevented from moving downward from its normal position by one end 47 of a latch bar 48 which forms a supporting seat for it. The end 47 is circular and forked as shown in Fig. 2 to pass freely on either side of a threaded pin 49 secured in the lower end of the lever carrier 40 and in axial extension of it. This carries washers 50—50 above and below the circular forked end 47 of the latch bar 48 to form a sliding pivotal connection between said latch bar and the lever carrier. This connection may be adjusted to take up back-lash or relieve friction by a nut and lock nut arrangement 51 threaded onto the lower end of the pin 49.

At a point substantially midway between its ends, the latch-bar 48 is provided with a bushed hub 52 which gives it a pivot bearing about a short horizontal shaft 53. This shaft is secured at its ends in bosses on the frame plates to which last it is perpendicular. Under the force of the lever carrier 40 bearing downwardly upon the forked end 47, the latch bar 48 tends to pivot clockwise about the pivot shaft 53 but is prevented from so doing by a latch 54 which normally and releasably engages and holds its opposite head end 55.

The latch 54 is of uniform thickness and is equally spaced from the frame plates. It is provided with a head 56 and a foot 57.

At a point between these it is keyed to a horizontal pivot shaft 58 which passes perpendicularly to the frame plates 12, 12 through bushed bosses thereon, provided as bearings for it. Outside the frame members, on one side, this shaft receives the hub of a horizontally extending hand trip and reset lever 59 also keyed to it and snugly held against the frame boss and prevented from sliding off by a pinned washer 60. This is shown in detail in Fig. 2. Outside the frame members on the other side, this shaft is provided with an enlarged head 61 which fits snugly against the frame boss and in conjunction with the hub of the lever 59, effectively collars said shaft against sliding movement. This is also shown in Fig. 2.

The head 56 of the latch 54 is notched as shown at A—B to receive the head end 55 of the latch bar 48. The notch A—B is so located that when engaged with said head end 55 an imaginary straight line drawn through the vertex of the notch and the axis of pivot shaft 58 will form an obtuse angle with a similar line drawn through the vertex of the notch and the axis of pivot shaft 53. The side A of the notch A—B is curved, being generated by a radius swinging about the axis of pivot shaft 58. Side B is flat and substantially vertical.

Freely pivoted on the shaft 58 to which the latch 54 is keyed, is an L-shaped trip lever 62 comprising two spaced arms located on either side of said latch in close sliding fit between it and the frame plates 12—12. It is pivoted at a point in its length substantially at the vertex of the L while at its upper end it is pivotally connected through a horizontal pivot stud 63 to one end of an emergency trip release rod 64. This last is in turn releasably held in the normally retracted position shown, by engagement at its opposite end with a manual or automatic emergency releasing device (not shown) such as the emergency governor mechanism of a prime mover. When released by such emergency device the release rod 64 tends to move in the direction indicated by the arrow.

The horizontal portions of the spaced arms of the L-shaped trip lever 62 are joined by a horizontal bridge piece 65 integral with and perpendicular to them and of sufficient width to lie partially beneath the foot 57 of the latch 54 and partially beneath a bracket 66, which last is integral with and joins the frame plates 12, 12.

That part of the bridge piece 65 which passes beneath the foot 57 is planed to meet a similar planed surface on the under side of said foot and through these planed surfaces, shown in contact at 67, movement between the trip lever and the latch may be transmitted.

Secured at one end in the bracket 66 is a spring-supporting rod 68 which is suspended vertically therefrom and which passes through an opening 69 in the bridge piece 65 to carry a helical trip-actuating spring 70 below. This spring encircles the supporting rod and is compressed to act between two centering collars 71, 71 slidably mounted on the latter. A lock nut arrangement 72 threaded onto the lower end of the rod beneath the lower collar provides adjustment for the spring compression. The upper collar transmits the spring action to the bridge piece 65 of the trip lever 62 through a knife edge bearing 73 integral with said bridge piece. The knife edge bearing is divided about the opening 69 to meet the upper collar on its diameter line whereby the collar will slide freely on the rod 68 without binding.

The operation of the particular embodiment of my invention shown in Fig. 1 is as follows:—the valve is shown in the full open position, having been raised to this position by the counter-clockwise rotation of the operating spindle 30 as viewed from the bevel pinion end.

The operating spindle 30 is held by the thrust bearing 31 to rotary motion only while the sliding sleeve 22 is held by the spline and splineway 29 to sliding motion only. Thus the rotation of said spindle, through that of the hand wheel 37 and the beveled drive pinion 35, will cause the sliding sleeve 22 to move up or down vertically, depending upon the direction of rotation and upon the screw thread employed. In this case the operating spindle 30 is provided with a left hand thread and the counter-clockwise rotation of the beveled drive pinion 35 as viewed from below it and the counter clockwise rotation of the hand wheel as viewed from above it will cause a downward movement of the sliding sleeve 22 with its attached parts, while rotation of the above named pinion or hand wheel will in the opposite direction cause an upward movement of the sliding sleeve 22 with its attached parts.

The vertical movement of the sliding sleeve 22 is transmitted to the cylindrical head 24 through the abutments 25—25 in the slot 23 and causes the lever 19 for which it forms one end, to pivot about its axis 45, in the lever carrier 40. The cylindrical head 18 at the opposite end of the lever, operating between the abutments 20—20 in the slot 17 in the valve rod extension 15 conveys to the valve rod 10, and hence to the valve 7, the opening and closing movement originating in a turn of the hand wheel 37. It will thus be seen that a turn of said hand wheel counter-clockwise as viewed from above it will tend to open the valve while a turn in the clockwise direction will tend to close the valve.

The operating spindle 30 and the sliding sleeve 22 are provided with a threaded length sufficient to fully open the valve before said sliding sleeve strikes the guide bearing 31 on said operating spindle. The thread pitch on the operating spindle is proportioned with respect to the moment arms of the fulcrum bar 19 and to other controlling factors to give, at the operating handwheel 37 the desired ratio between ease of operation and speed of operation. The pitch of the screw-thread must always give irreversible action, that is, it must never be so steep that the valve which is of the unbalanced type, as has been explained in the beginning, will tend to rotate the operating spindle and close itself in that manner.

The normal operation of the valve, that is, through the operating spindle, can be effected only when the lever carrier 40 is in its upper or set position as shown. In this position it receives the downward thrust and weight of the valve 7 through the lever 19, which under this force tends to pivot about the cylindrical head 24.

The lever carrier is, however, maintained rigidly in this position by the forked end 47 of latch bar 48 which supports it from beneath. This tends to rotate said latch-bar clockwise, (as viewed in the drawing), about the pivot shaft 53, but this is prevented by the hardened end 55 at its other end engaging in the notch A—B in the head 56 of latch 54.

The latch 54 is slightly biased by the small unbalanced force resulting from the angle of this engagement to rotate with the pivot shaft 58 counter-clockwise as viewed in the drawing such that it bears through its projecting foot 57 firmly against the horizontal bridge piece 65 through the faced abutting surfaces 67. It tends thus to move the trip lever 62 counter-clockwise as viewed in the drawing but it cannot do this without further compressing the trip actuating spring 70 which is already compressed to a degree sufficient to insure positive tripping of the mechanism under all conditions, when released. The trip-rod 64 is releasably held by an emergency governor mechanism not shown or by such other device or mechanism as may be provided to control the tripping action of the valve, against the action of the compressed trip actuating spring 70, which bears upwardly against the horizontal bridge member 65 tending to rotate the trip-lever 62 clockwise, as viewed in the drawing about the pivot shaft 58 and to thus bias the trip-rod 64 in the direction of the arrow.

With the valve now in any open position as shown, having been opened by a counter-clockwise rotation of the operating handwheel 37, it may be closed in any one of three ways thus, (1) by the clockwise rotation as viewed above of the operating hand-wheel, (2) by manually lifting the handle of the hand trip and reset lever 59 and (3) by the release of the trip rod 64 by the device which holds it.

The first method has been described and is the normal way. The second method is used when it is necessary to close the valve more rapidly than it could be done by the first method, as in an emergency condition. Lifting the handle of the hand trip and reset lever 59 in no way disturbs the trip actuating spring 70, the trip-lever 62 or the trip-rod 64, as the hand trip and reset lever 59 and the latch 54 are both keyed to the shaft 58, while the trip-lever 62 is free upon the shaft 58. Thus the upward movement of the handle of the hand trip and reset lever 59 will carry the latch 54 clockwise with it, causing the projecting foot 57 to leave contact at 67 with the horizontal bridge piece 65 and causing the notch A—B on the head 56 sliding on the surface A to leave the hardened end 55 of the latch-bar 48.

When the end 55 and the notch A—B are fully disengaged the lever carrier is then unsupported, since the latch-bar 48 is then free to pivot about shaft 53. The lever 19 is then held at but one end 24 and the valve 7 is without support against the action tending to close it. Under this action it is now forced instantly to the closed position carrying downwardly with it the lever carrier 40 to its lower or tripped position.

The cylindrical head 24 acts in this case as a pivot for the lever 19. Any tendency of the latch bar 48 to continue in rotation about the pivot shaft 53 after the lever carrier comes to rest is prevented by the end 47 being held by a washer 50 below it.

The rapidity of the closing action is controlled by the dash pot 8 of the valve (but the cushioning effect there obtained may, in connection with simpler valves not having this feature, be provided by embodying a device of that nature in the valve operating mechanism itself).

In the third method, the release of the trip rod 64 gives free action to the trip actuating spring 70 which, acting beneath the horizontal bridge member 65 rotates it clockwise as viewed in the drawing about the axis of shaft 58. This clockwise rotation is transmitted to the latch 54 through the abutting surfaces 67 and the valve is tripped as before in the second method.

When the valve has been tripped closed, the mechanism must be reset before the valve may be reopened. The operating spindle is turned clockwise as in manually closing the valve until the sliding sleeve 22 is raised to the valve-closed position or upper limit of its travel, that is, until the lever 19, pivoting about cylindrical head 18 which is held, it will be seen, by the valve rod extension 15, carries the lever carrier 40 upward to its normal position which is determined by the stop shoulder 46 closely approaching or meeting the lower end of the bearing 41.

This movement of the lever carrier 40 will have carried the forked end 47 of latch bar 48 with it, that is, the latch bar, being slidably pivoted to the lever carrier by the calipering collar arrangement shown, will have been pivoted counter-clockwise (as viewed in the drawing), about the pivot shaft 53 to assume its original latched position. In pivoting to this position, its end 55 strikes and depresses the head 56 of the latch 54 until the notch A—B again engages with the end 55.

If the valve has been tripped normally the latch will have been automatically returned immediately to its original position to thus engage with the latch-bar, as the weight of the hand trip and reset lever 59 tends to rotate the shaft 58 and hence the latch 54 counter-clockwise (as viewed in the drawing), until the projecting foot 57 on said latch is brought to bear against the horizontal bridge piece 65 at the planed surfaces 67. All parts of the mechanism are now reset in position as if the valve had been merely manually closed in the normal way, by means of the operating spindle.

If the valve has been automatically tripped, that is, by the release of the trip-rod 64, said trip-rod must be re-engaged with the device by which it is releasably held. This is accomplished by carrying the handle of the hand trip and reset lever 59 downwardly, which in turn rotates the latch 54 counter-clockwise (as viewed in the drawing), and through the contact surfaces 67 rotates the trip lever 62 counter-clockwise also. The horizontal bridge member 65 is carried downwardly, compressing the trip actuating spring 70, and the trip-rod 64 is carried in the direction opposite to that indicated by the arrow until it engages with the particular controlling device employed in conjunction with the valve mechanism. This brings the notch A—B into position to receive the end 55 of the latch bar 48 as described above in connection with manual tripping; the resetting operation being the same as before from this point. Should the order of operations in resetting the mechanism after automatic tripping be reversed, such that the latch bar end 55 is presented for engagement with the notch A—B before the head 56 of latch 54 is in position to receive it no difficulty will be experienced. The subsequent resetting of the trip rod 64 by moving the handle of the hand trip and reset lever 59 downward as before described will in this case complete the resetting operation, as the latch will slide onto the head 55 along the engaging surfaces A, these surfaces, as has been stated before, being generated by a radius swinging about the axis of shaft 58.

Figures 3, 4:
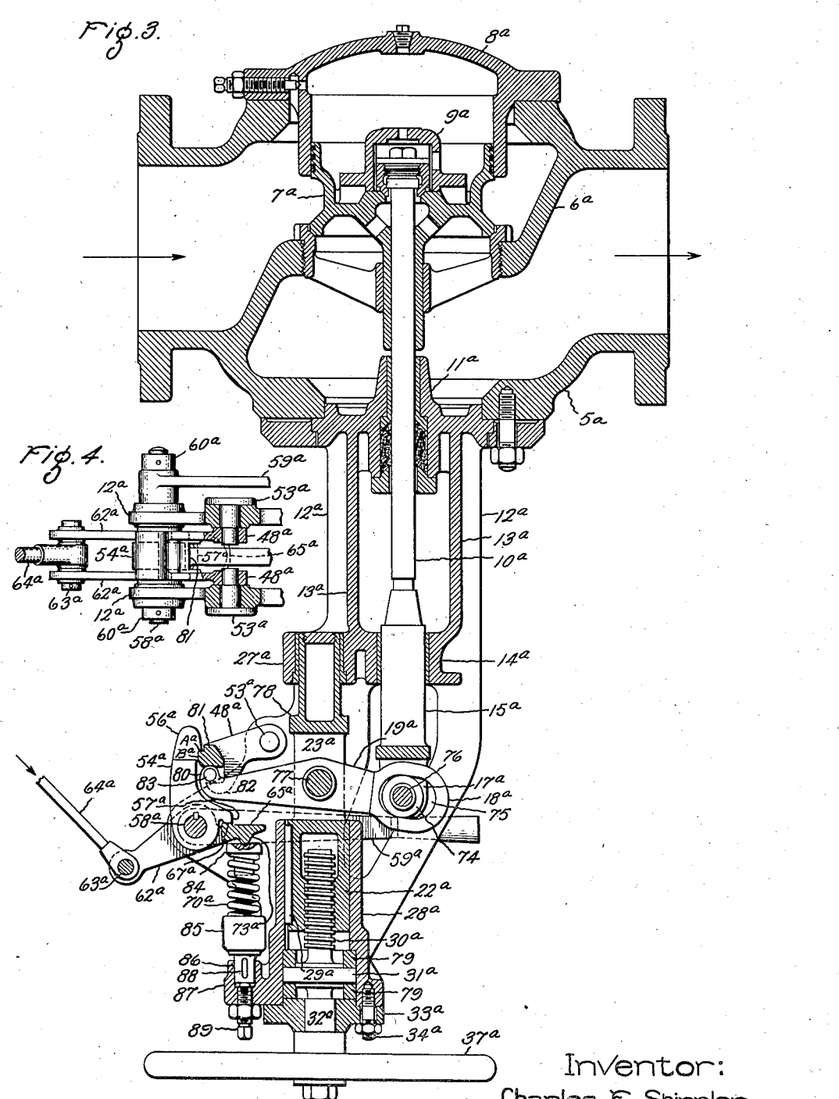
Fig. 3 illustrates in section another embodiment of my invention wherein the valve mechanism is shown in the closed position after normal closing.
Fig. 4 is a detail showing a reduced size top view of the tripping mechanism of Fig. 3.

Referring now to Figs. 3 and 4, a further embodiment of my invention is shown applied to the valve of Fig. 1. Similar names and the same numbers are used for like parts throughout the figures of the drawings except that in Figs. 3 and 4 the exponent "a" is added to distinguish such parts from those of Figs. 1 and 2. The valve here shown has been described in connection with the last-named figures, and a further description here is believed to be unnecessary. The flanged stuffing box $11^a$ is rigidly clamped to the valve casing $5^a$ and suspended from and integral with it are two flat parallel frame plates $12^a$, both of which are shown in part in Fig. 4. These carry and support the valve mechanism between them and are rigidly held in spaced parallel relation to each other, throughout by webs and bearing brackets integral with and joining them after the manner of the frame plates of the previously described embodiment of my invention.

Two such webs $13^a$, $13^a$ join the stuffing box flange above, and at a distance below join a bearing bracket $14^a$. This bearing is bushed to form a guide bearing for a cylindrical valve rod extension $15^a$. The valve rod extension $15^a$ is diametrically slotted as shown at $17^a$ at its lower end to receive an elongated head $18^a$ on one end of a lever $19^a$. A sliding pivotal connection between said lever and the valve rod extension $15^a$ is maintained through operating contact between a short roller 74 carried by the extension $15^a$ and mounted in the slot $17^a$, and an elongated opening 75 in the head $18^a$ through which the roller passes. The roller 74 is shouldered at both ends and mounted on a short shaft 76 secured at its end in the walls of the slot. The axis of the shaft cuts the axis of the valve rod extension $15^a$ at right angles and is located a distance from the top of the slot sufficient to give the head $18^a$ free movement between it and the roller, such that all movements between the valve rod extension $15^a$ and the lever $19^a$ will be transmitted through the contact between the roller 74 and the sides of the elongated opening 75. The width of the elongated opening 75 is slightly greater than the diameter of the roller and its length is such that the roller in operation will not fully reach either end of it.

At substantially midway between its ends the lever $19^a$, of comparatively thin, rectangular section, passes diametrically through a slot $23^a$ provided for it in a sliding sleeve $22^a$. It is therein pivoted on and carried by a short horizontal shaft 77 which is in turn secured at its ends in and perpendicular to the walls of said slot. Thus the lever $19^a$ is carried by the sliding sleeve. The length of the slot $23^a$ is such that the lever $19^a$ may pivot about the shaft 77 throughout the full operating movement of the valve without striking the ends of said slot.

The sliding sleeve $22^a$ is guided and supported in two bearing brackets $27^a$ and $28^a$ which are cast integral with the frame plates $12^a$, $12^a$. The upper bearing $27^a$ carries and guides the upper reduced end of the sliding sleeve $22^a$, which last is of sufficient length to insure the full upward valve opening movement of the sliding sleeve, before a shoulder 78 provided thereon as a stop meets the lower faced end of bearing bracket $27^a$. Bearing bracket $27^a$ is bushed similar to bearing bracket $14^a$ to which it is also webbed. The lower bearing bracket $28^a$ serves as a guide and support for the sliding sleeve $22^a$ and a spline and spline-way $29^a$ located therein serves to confine said sliding sleeve to sliding movement only. These bearings maintain the sliding sleeve $22^a$ parallel to and axially in the same plane with the valve rod extension $15^a$ and are widely separated to insure smooth operation of the sliding sleeve.

The lower end of the sliding sleeve is axially threaded to receive a square threaded operating spindle $30^a$ and is here shown in its lowermost position with the operating spindle fully threaded into it. The operating spindle is enlarged at a point in its length to seat between two annular bearings 79—79 forming therewith a thrust bearing $31^a$ in a counterbore at the lower end of the bearing bracket $28^a$.

A flanged cover plate $33^a$ is fitted over the faced lower end of bearing bracket $28^a$ and is secured thereto by a series of threaded pins $34^a$, one of which appears in the section of the figure. The cover plate extends within the counterbore to hold the bearing rings 79—79 in position. It forms a guide bearing also for a necked portion $32^a$ of the operating spindle which extends downwardly through it to receive an operating handwheel $37^a$. This is secured to the operating spindle after the manner of the beveled operating pinion 35 in Fig. 1, and it is obvious that such a pinion might, if desired, be used here in place of the handwheel $37^a$.

The end of the lever $19^a$, opposite that carrying the elongated head $18^a$ is upturned and rounded to form a toe 80 which is maintained in sliding pivotal connection with a latch bar $48^a$.

This last, in the form of two flat, spaced parallel arms, carries integral with it between adjacent ends of said arms, a horizontal abutment member 81. This normally prevents upward movement of the toe 80 which bears beneath it. The arms are extended downwardly on either side of the toe 80 and forward to form retracting hooks 82 which lie beneath the ends of the abutment member 81 in spaced parallel relation thereto. A retracting pin 83 is passed through and secured in the toe 80 to lie parallel to the abutment member with its ends lying midway and with slight clearance between the retracting hooks and the ends of said abutment member.

The latch bar is carried at its opposite end on two short, oppositely disposed, coaxial pivot studs $53^a$ projecting into it from the frame plates $12^a$—$12^a$. The axis of these studs is located substantially above and parallel to that of the pivot shaft 77. The plan of this arrangement is further shown in Fig. 4.

A latch $54^a$ is mounted on and keyed to a horizontal pivot shaft $58^a$ to swing into substantially a vertical position and into engagement with a notch $A^a$—$B^a$ in the abutment member 81. For the purpose of thus engaging with this abutment member the upper end of the latch $54^a$ is widened to form a head $56^a$ substantially the width of the abutment member with which it engages. The surfaces engaging at $A^a$ are generated by a radius swinging about the axis of the pivot shaft $58^a$, while the surfaces engaging at $B^a$ are generated by a radius swinging about the axis of the studs $53^a$.

The pivot shaft $58^a$, to which the latch $54^a$ is keyed, projects through oppositely disposed bosses on the frame plates which provide pivot bearings for it, and is prevented from axial sliding by pinned washers $60^a$—$60^a$ shown in Fig. 4. Between the washer at the rear, as viewed in the drawing and the adjacent frame boss, hand trip and reset lever $59^a$ is keyed to the shaft. This lever extends radially from it horizontally so that a handle at its other end will lie within easy reach of the operating handwheel $37^a$.

Pivotally mounted on shaft $58^a$ is a trip lever $62^a$ which comprises two spaced parallel arms located between the frame plates and either side of the latch $54^a$. The two arms of this trip lever are joined at their inner ends by a horizontal bridge piece $65^a$ which is integral with them. The bridge piece $65^a$ passes beneath a foot projection $57^a$ on the latch $54^a$. Abutting planed surfaces on each are adapted to meet at $67^a$ and to transmit driving movement between the trip lever $62^a$ and the latch $54^a$.

Beneath the bridge piece $65^a$ a downwardly projecting knife edge bearing $73^a$ integral with it meets a diametrical depression in the top of a spring cap 84. This in turn receives the upward thrust of a compressed helical trip actuating spring $70^a$ which is seated at its lower end in a spring supporting guide cup 85. The cup 85 is reduced in diameter at its lower end to fit slidably into a socket 86 provided for it in a supporting bracket 87 webbed to the lower end of bearing bracket $28^a$. A key 88 slidably fitted into a keyway located within the socket prevents rotation of the cup 85, and an adjustment screw 89 provided with a lock nut provides means for adjusting the compression of trip actuating spring 70ª.

The trip lever 62ª tends to rotate counter-clockwise about the pivot shaft 58ª under the action of the trip spring 70ª bearing upwardly at the bridge piece 65ª, but is normally prevented from doing so by a trip release rod 64ª, one end of which is pivotally connected between the outer divided ends of the trip lever by a horizontal pivot stud 63ª while the other end of said trip rod is releasably held by a manual or automatic emergency releasing device (not shown) such as the emergency governor mechanism of a prime mover. When released trip rod 64ª tends to move in the direction of the arrow under action of the trip actuating spring 70ª.

The operation of the particular embodiment of my invention shown in Fig. 3 here follows: The valve is shown in the closed position and may be opened only by turning the handwheel 37ª counter-clockwise as viewed from above it. This causes the operating spindle 30ª to tend to unthread out of the sliding sleeve 22ª. However the thrust bearing 31ª prevents this and since the sliding sleeve 22ª may slide axially, the latter moves upward off the operating spindle. This movement carries pivot axis 77ª of the lever 19ª upward, but the whole lever cannot follow this movement as the rounded toe end 80 bears upwardly against the locked and immovable abutment member 81 of the latch bar 48ª. Hence the lever pivots about the point of contact of the toe 80 with the abutment member 81 and the opposite end 18ª moves upward bearing against the roller 74 through the lower side of the elongated slot 75. This carries the valve rod extension 15ª upward, together with the valve operating rod 10ª, and thereby moves the valve 7ª upward and open, the degree of opening being determined by the amount the handwheel 37ª is turned.

In closing the valve manually by the handwheel 37ª the operating spindle merely assists the force tending to close the valve so that the toe 80 of the lever 19ª will be held in contact with the abutment member 81, and the roller 74 will bear against the lower side of the slot 75 the same as when opening the valve. Should the fluid pressure fail and the valve be thereafter closed the weight of the valve would prove sufficient to supply the closing force under this condition which would not be an emergency condition.

In both the opening and closing actions under manual operation, the fulcrum point of the lever is at the toe 80 the moving force is at pivot 77 and the weight at the roller 74, the difference between the two actions being that in opening the valve the moving force acts upwardly or actively at 77, while in closing the valve it acts downwardly or passively thereat.

With the valve in any open position the valve may be closed under emergency conditions other than by the handwheel in two ways, namely, (1) by manually lifting the handle of hand trip and reset lever 59ª and (2) by the automatic or manual release of the trip rod 64ª by the device which holds it.

If manually tripped as by the first method, the upward movement of the handle of the hand trip and reset lever 59ª will rotate the shaft 58ª counter-clockwise as viewed in the drawing thereby moving latch 54ª which is keyed to said shaft. Since trip lever 62ª is loose on shaft 58ª it will not be moved. The surfaces at the notch Aª—Bª will disengage as the latch 54ª thus turns counter-clockwise, with the result that the toe 80 of the lever 19ª will be free to fly upwardly, pivoting about shaft 77 under the closing force acting downwardly on the valve 7ª and transmitted to the roller 74. The valve 7ª thus unsupported will be forced instantly to the closed position by the unbalanced fluid pressure above it.

The latch bar 48ª will pivot about the studs 53ª as the abutment member 81 is carried upward by the toe 80 of the lever 19ª. When the released valve dropping rapidly to the closed position, suddenly seats, the lever 19ª and the toe 80 will stop comparatively suddenly and any tendency of the latch bar 48ª to continue to rotate about studs 53ª will be prevented by the retracting hooks 82 engaging with the retracting pin 83. This manual tripping action will in no way affect the trip release rod 64ª, the trip lever 62ª or the trip actuating spring 70ª, as the engaging surfaces at 67ª between the trip lever bridge member 65ª and the latch heel 57ª are separated by this manual tripping movement instead of acting one against the other as in the automatic tripping movement hereinafter described.

After manually tripping the valve closed from any open position, the weight of the hand trip and reset lever 59ª tends to return the latch to its original position rotating clockwise as viewed in the drawing until the latch heel 57ª meets the top of the bridge piece 65ª at the abutting surfaces 67ª. In this position the latch is ready to reengage with the abutment member 81 of the latch bar 48ª which is moved down into normal position by operating the handwheel 37ª as if normally closing the valve. The valve being already closed, the lever 19ª will pivot about the roller 74 as the sliding sleeve 22ª is moved downward. The toe 80 of the lever 19ª is thus moved downward carrying the abutment member 81 of latch bar 48ª with it through retracting pin 83 which engages with the retracting hooks 82. This brings the abutment member 81 and notch A^a—B^a into normal position and the resetting operation in this case is completed when the latch head 56^a, slightly displaced to the left by the descending abutment member 81 snaps into engagement with the notch A^a—B^a.

In case the emergency tripping mechanism is actuated by the automatic controlling device, such as the emergency governor of an elastic fluid turbine, the release of the trip rod 64^a allows the trip lever 62^a to pivot about shaft 58^a counter-clockwise, as viewed in the drawing, under the expanding upward action of the trip actuating spring 70^a acting beneath the bridge piece 65^a. This bridge piece 65^a, bearing through the abutting surfaces 67^a against the latch heel 57^a on the latch 54^a, carries the latch counter-clockwise also, which releases the mechanism in the same manner as if the handle of the hand trip and reset lever 59^a had been raised manually. In fact, this lever, being keyed to the shaft 58^a moves with the latch 54^a.

To reset the mechanism after automatic tripping, the handle of the hand trip and reset lever 59^a is moved downward, which action rotates the latch 54^a clockwise, the latch heel 57^a bearing downwardly on the bridge piece 65^a at the abutting surfaces 67^a. This compresses the trip spring 70^a and rotates the trip lever 62^a clockwise as viewed in the drawing until the trip release rod 64^a, moved in the direction opposite to that indicated by the arrow, latches into position in the emergency or holding device employed with it. The remainder of the resetting operation is as described above as after manual tripping.

In any case when the valve has been tripped closed, the mechanism must be reset before it may be reopened; that is, the toe 80 of the lever 19^a must be held against upward movement by the abutment member 81 of the latch bar 48^a. This abutment member in turn must engage or be made to engage with the head 56^a of the latch 54^a at the notch A^a—B^a.

Should the sliding sleeve 22^a be brought to the valve-closed position before the latch is reset into position to engage the descending abutment member 81 after automatic tripping, there will be no difficulty in engaging the latch head 56^a with the notch A^a—B^a as said latch head, pivoting into position under the downward movement of the hand trip and reset lever 59^a as before described, will engage with said notch A^a—B^a along the surface A^a which, being generated by a radius swinging about the axis of shaft 58^a as hereinbefore described, will offer no resistance to this engaging action.

It will be noted throughout both embodiments of my invention that the lever 19 or 19^a is full floating and entirely movable. The fulcrum point of the lever is also not fixed but is located temporarily in each of the pivot axes of the lever in sequence as the various operations of the valve mechanism require. This is a desirable feature in that it does away with the objectionable toggle linkages common to former constructions and the operating handwheel does not drop or slide on tripping the valve, the closing action of the valve being transmitted to the floating lever only.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. The combination with a throttle valve of the self-closing reciprocating type, of a lever pivotally connected therewith, a releasable support for the lever, a sliding sleeve pivotally connected with the lever, and a screw threaded spindle for moving the sliding sleeve.

2. The combination with a self-closing throttle valve, of an operating rod connected therewith, a lever pivotally connected with said operating rod, a latch releasable means pivotally supporting the lever, a sliding sleeve pivotally connected with the lever, a screw threaded operating spindle upon which the sliding sleeve is adapted to move, and means for rotating the operating spindle to move the sliding sleeve.

3. In a combined throttle and emergency valve mechanism, the combination of a movable operating lever, a valve operating rod pivotally connected therewith, a supporting member for the movable operating lever pivotally connected with it, a latch normally engaging the supporting member, means for moving the latch out of such engagement comprising a hand lever and an emergency releasable means operatively connected with the latch, an actuating member for the movable operating lever pivotally connected with it, a non-slidable operating spindle onto which the actuating member is threaded, and means for rotating the operating spindle.

4. In a combined throttle and emergency valve mechanism, the combination of a movable operating lever having three axially parallel pivot axes located along its length, a sliding rod connected at one of said pivot axes, said rod being adapted to move a valve, a releasable supporting means for the lever connected at a second of said pivot axes, a movable latch in said supporting means, a lever for manually moving the latch, an emergency releasable means for moving the latch, a hand wheel for operating the valve, a threaded spindle operatively connected therewith, a thrust bearing for the spindle, and a sliding sleeve for the spindle threaded to move thereon and connected with the lever through the remaining pivot axis.

5. The combination with a valve casing, a valve therein and an operating rod for the valve, of a frame fixed to the valve casing and provided with a guide for the operating rod, a second guide in the frame, a member which slides therein, a lever pivotally connected to said rod and to said member, a fulcrum for the lever carried by said frame, manually operated means for sliding the said member in its guide to turn the lever on its fulcrum for opening and closing the valve, a releasable support for said fulcrum, and means for releasing it to permit the valve to close independently of said manually operated means.

In witness whereof, I have hereunto set my hand this 13th day of February, 1923.

CHARLES E. SPINNLER.